W. H. Elliot.
Brewing Beer &c.

Nº 76177 — Patented May 31, 1868.

Witnesses:
M. L. Elliot
Lowell Elliot

Inventor:
Wm H. Elliot

United States Patent Office.

WILLIAM H. ELLIOT, OF NEW YORK, N. Y.

Letters Patent No. 76,177, dated March 31, 1868.

---

IMPROVEMENT IN BREWING BEER AND OTHER MALT LIQUORS.

---

The Schedule referred to in these Letters Patent and making part of the same.

---

TO ALL WHOM IT MAY CONCERN:

Be it known that I, WILLIAM H. ELLIOT, of the city, county, and State of New York, have invented a new and improved Process of Brewing Beer and other Malt Liquors; and I do hereby declare that the following is a full and exact description thereof, reference being had to the accompanying drawings, and to the letters of reference marked thereon.

Similar letters of reference indicate the same devices in all the figures.

To enable others skilled in the arts to comprehend, make, and use my invention, I will proceed to describe its nature, construction, and operation.

The nature of my invention consists in condensing the vapors of the boiling wort and returning them to the boiling-tank as fast as condensed, and afterwards cooling the contents of the boiling-tank, which are composed of the wort, with the condensed vapors returned to it, by passing it through an enclosed surface-cooler as it is conducted from the boiling-tank to a suitable reservoir; and in the employment of an enclosed surface-cooler, in combination with a boiling-tank, which is provided with a condenser for condensing the vapors of the wort, and a pipe for returning them to the boiling-tank as fast as condensed.

Figure 1:
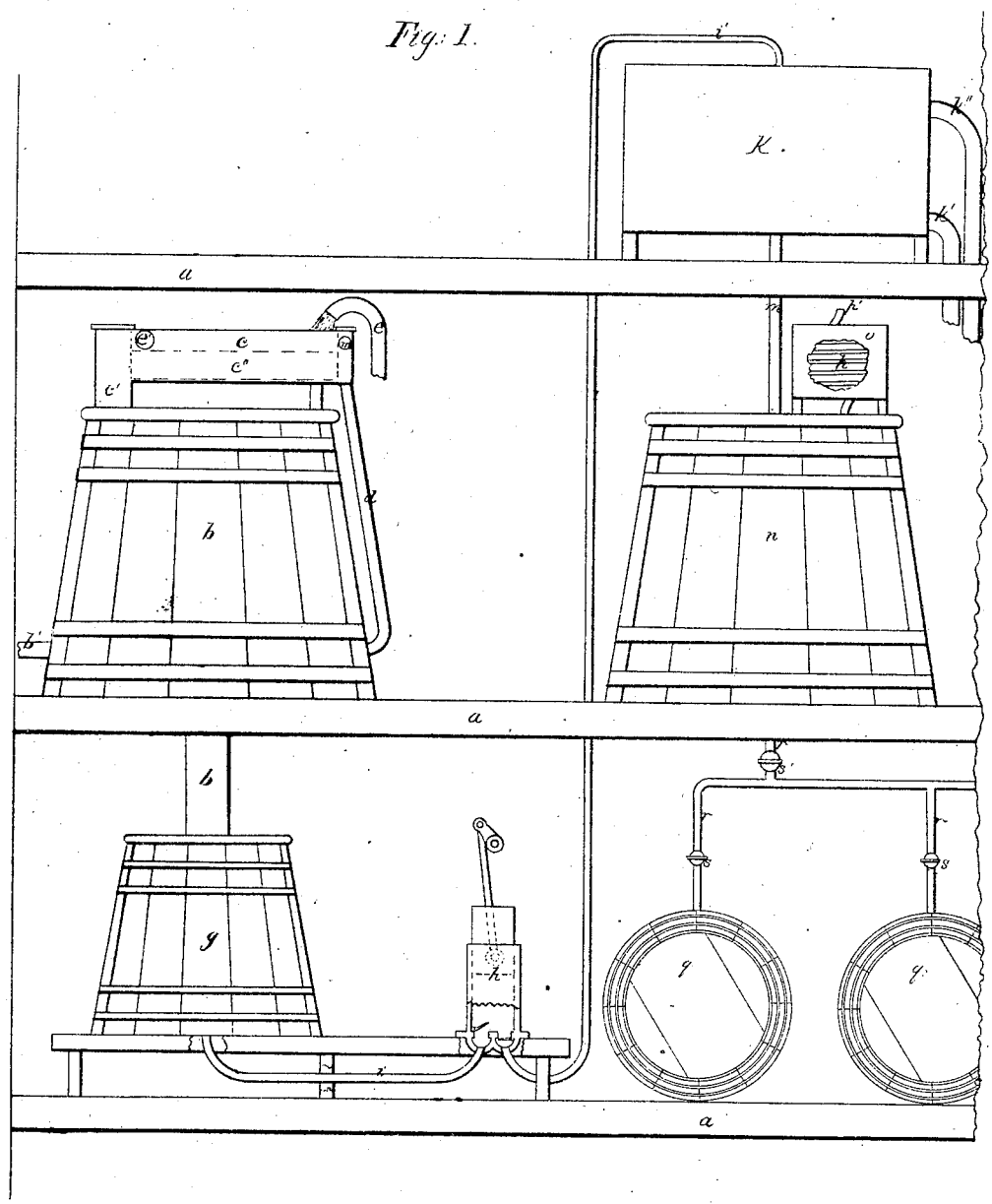
Figure 2:
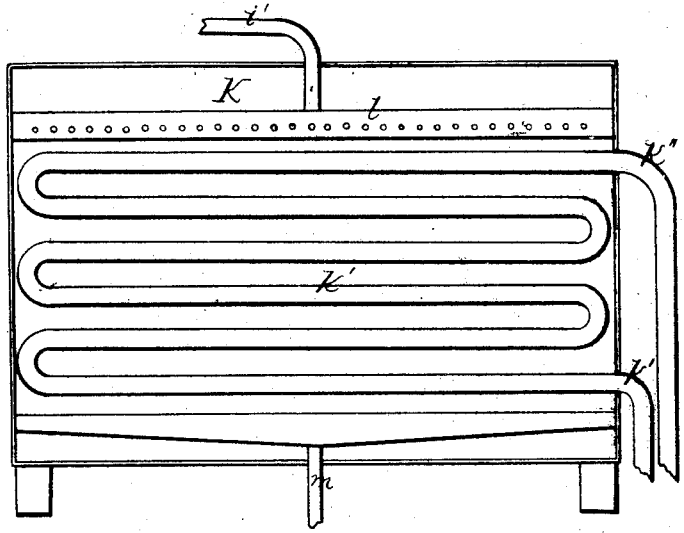
Figure 3:
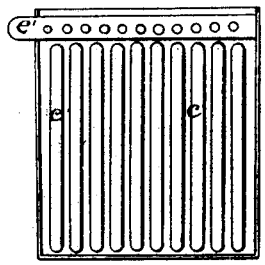
Figure 4:
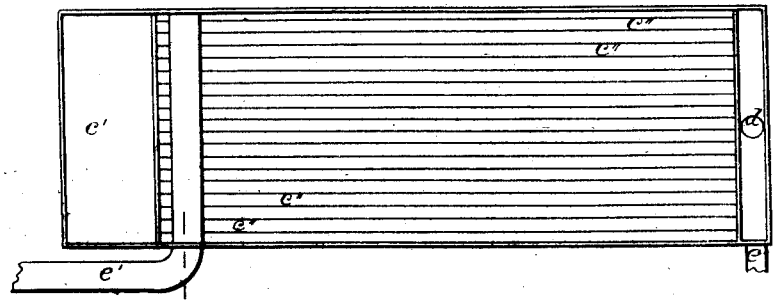

Figure 1 is an elevation of a portion of a distillery.
Figure 2 is a vertical section of a surface-cooler.
Figure 3 is a cross-section of a condenser.
Figure 4 is a horizontal section of the same.

$a$, framework of the distillery; $b$, tank, and $b'$ steam-heating pipe for boiling the wort; $c$, condenser; $c'$, conducting-pipe for vapor from the tank to the condenser; $c''$, thin passages in the condenser, which are surrounded by water, and serve as condensing-surfaces. These open into conducting-pipe $c'$ at one end, and into pipe $d$ at the other end. $e$, water-pipe which brings cold water to the condenser; $e'$, water-pipe which carries off water after it has passed through the condenser; $e''$, opening for the escape of atmospheric air and non-condensable gases from the boiling-tank; $f$, pipe for conducting the contents of tank $b$ to tank $g$. Tank $g$ is provided with a strainer, at a suitable height above the bottom, which separates the dregs of the wort from the liquid. $h$, pump for raising the wort from the lower part of tank $g$ to cooler $k$, through pipes $i$ and $i'$. The passages $c''$ descend a little towards pipe $d$, which conducts the condensed vapors back to the lower part of tank $b$. Cooler $k$ is similar to a French cooler, except that it is enclosed in an air-tight case, so that the aroma of the wort cannot escape from it. $k'$, pipe which brings cold water to the cooler. This pipe is folded upon itself within the cooler in a vertical serpentine form. $k''$, that portion of the pipe which conducts the water away from the cooler.

As the wort enters the cooler through pipe $i'$ it falls into trough $l$, and drips through openings in the bottom of the trough upon the pipe $k$, and from one fold of the pipe to another, till it is collected into pipe $m$ at the bottom of the cooler, which conducts it to the tank or reservoir $n$. This tank is provided with a small surface-cooler, $o$, through which non-condensable gases and air may escape, but which is intended to condense and return to the reservoir all condensable vapors. This condenser is provided with a spiral pipe, $p$, which is opened at its upper end at $p'$. The spaces around and between the pipe should be packed with a freezing-mixture of salt and ice, to make it perfectly effectual. After the wort and its condensed vapors have been collected in reservoir $n$, its contents may be let down into working-tuns $q$ through pipes $r$, being governed by stop-cocks $s$.

My process for brewing beer or other malt liquors with the apparatus herein described is as follows: When the wort has been prepared for boiling in a proper manner, steam is let into pipe $b'$, and the operation begins. As the vapors of the boiling wort rise they pass into the passages $c''$, which, being surrounded by cold water, condense them to a liquid. This liquefied vapor runs into pipe $d$, and is conducted into the lower part of tank $b$, from whence it came in the form of vapor. This liquid contains the aromatic and volatile oils of the malt and hops. If the cover of the tank be perfectly air-tight, and the condenser properly supplied with cold water, none of the fine aroma of the wort will escape. After the wort has been sufficiently boiled, it is let down into tank $g$, where it is strained, and is then pumped up into the cooler. The cold water, which is brought to the cooler by pipe $k'$, first passes through the lower folds of this pipe, then through the next one above it, till it reaches the top fold, from whence it passes off through to pipe $k''$. The wort descends from top to bottom of the cooler, dripping from fold to fold. As the water rises in the cooler it becomes heated nearly to the temperature of the wort, but, as the wort descends, it falls upon less heated folds until it reaches the bottom, where the pipe is of the same temperature as the coldest water. The wort, after being cooled, passes from the cooler to reservoir $n$ through pipe $m$, where it is stored preparatory to conducting it to the working-tuns.

At the beginning of the process both the boiling-tank and reservoir contain air and non-condensable gases, which must have an opening for escape. Such an escape from tank $b$ is provided at $e''$, and from the reservoir at $p'$, but in either case the air cannot escape without first passing through a surface-condenser, which takes from it any condensable vapors with which it may be charged.

Thus, by this process, all the fine aroma of the malt and hops is retained in the wort, which is readily distinguishable in the liquor after it has been fermented.

Having described my process for brewing malt liquors, what I desire to claim, and to have secured to me by Letters Patent of the United States; is—

1. Condensing the vapors of the boiling wort, and returning them to the boiling-tank as fast as condensed, and afterwards cooling the condensed vapors and the wort together by passing them through an enclosed surface-cooler, as herein specified.

2. The combination of an enclosed surface-cooler with a boiling-tank, which is provided with a condenser for condensing the vapors of the wort, and with a pipe for conducting the condensed vapors back to the boiling-tank as fast as condensed, as herein specified.

WM. H. ELLIOT.

Witnesses:
   M. L. ELLIOT,
   LOWELL ELLIOT.